US010326199B2

(12) United States Patent
Au

(10) Patent No.: US 10,326,199 B2
(45) Date of Patent: Jun. 18, 2019

(54) LOW PROFILE ANTENNA

(71) Applicant: T-Mobile USA, Inc., Bellevue, WA (US)

(72) Inventor: Chad Au, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 9 days.

(21) Appl. No.: 15/664,229

(22) Filed: Jul. 31, 2017

(65) Prior Publication Data

US 2019/0036209 A1 Jan. 31, 2019

(51) Int. Cl.
*H01Q 1/44* (2006.01)
*H01Q 1/48* (2006.01)
*H01Q 1/24* (2006.01)
*H01Q 1/12* (2006.01)
*H04L 5/14* (2006.01)
*H01Q 1/38* (2006.01)
*H01Q 3/34* (2006.01)

(52) U.S. Cl.
CPC ............. *H01Q 1/44* (2013.01); *H01Q 1/1221* (2013.01); *H01Q 1/246* (2013.01); *H01Q 1/48* (2013.01); *H01Q 1/38* (2013.01); *H01Q 3/34* (2013.01); *H04L 5/1461* (2013.01)

(58) Field of Classification Search
CPC ............ H01Q 21/00; H01Q 3/12; H01Q 3/36; H01Q 1/12; H01Q 1/48; H01Q 1/44; H01Q 1/246; H01Q 1/221; H01Q 3/34
See application file for complete search history.

(56) References Cited

U.S. PATENT DOCUMENTS

| 2003/0142018 A1* | 7/2003 | Lange | H01Q 1/007 343/700 MS |
| 2007/0205955 A1* | 9/2007 | Korisch | H01Q 1/246 343/853 |
| 2010/0103060 A1* | 4/2010 | Au | H01Q 1/1221 343/720 |
| 2013/0021215 A1* | 1/2013 | Suzuki | B29C 45/14 343/787 |

* cited by examiner

*Primary Examiner* — Hoang V Nguyen
(74) *Attorney, Agent, or Firm* — Lee & Hayes, P.C.

(57) ABSTRACT

Low-profile antenna systems and methods to mount same. The system can include a low-profile antenna surface mountable to an exterior surface of a building, parking deck, or other suitable structure. Additional electronics can be remotely mounted to maintain the low profile of the system. The system can be color-matched, or otherwise camouflaged, to maintain building aesthetics. The low-profile antenna can include a transparent substrate to enable the system to mounted on windows and other clear surfaces. The low profile of the antenna enables the antenna to be mounted to existing structures without reinforcement, or other modification, to the structure. The system can also include one or more heating elements and heat sensitive adhesive to enable the system to be installed without fasteners and removed without damage to the structure.

20 Claims, 16 Drawing Sheets

LOW PROFILE ANTENNA

BACKGROUND

Cellular and other wireless networks are capable of sending and receiving frequencies used for data and voice communications, among other things. These voice and data connections are generally sessions originated at a central switch center and transported via fiber optic cable to a radio base station (e.g., eNodeB, or eNB) for LTE or other wireless technology and propagated by the use of antennas. A majority of these antennas are mounted on traditional cell towers (also known as macro cells), but can also include other antenna shapes or be in the form of mini cells, micro wireless devices, and other technologies. In densely populated areas, such as large urban centers, the throughput required by users can outpace the throughput provided by large cell towers.

The number of conventional cell towers in a given location is often limited by local zoning codes, space availability, and the capital investment required to install a cell tower. Installing a standard cell tower, for example, can cost from several hundred thousand dollars to millions of dollars. In addition, many people do not want a cell tower installed near them because they believe them to be an eyesore, for example. Unfortunately, cellular devices, such as cellular phones, smart phones, and tablet computers, for example, have relatively limited ranges over which they can send and receive cellular signals. Thus, cell towers must be relatively close together to provide sufficient coverage and the desired throughput.

Almost by definition, however, in urban location, buildings, parking decks, and similar structures are plentiful, with buildings almost touching in many locations. Many of these structures could serve as installation sites for cell towers. Installing a large cell tower on existing structures, however, can require reinforcement of the structure, bracing, power upgrades, and other modifications, which increases costs and may affect the life of the building, among other things. As mentioned above, placing a cell tower on top of a building may be locally opposed for aesthetic, and other, reasons. In addition, in many locations, placing a cell tower on top of a building, for example, may provide reduced throughput simply because the signals are blocked by the building itself and surrounding buildings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As mentioned above, the number of cell towers, or "macro sites," capable of handling a large amount of cellular throughput may be limited by zoning, topographical, aesthetic, and other considerations. Other technologies exist that can be used to "fill the gaps." Micro-, pico- and femptocells, for example, are small cellular transceivers that can be installed in areas of high traffic to provide additional connectivity for cellular user to the cellular backbone. Indeed, a variety of small cellular transceivers, antenna arrays, and other equipment can be installed on streetlights, billboards, and other structures for this purpose.

For simplicity and clarity, the sometimes ambiguous terms "bandwidth" and "throughput" will be used in different, and specific ways, herein. The term bandwidth will be used to specifically refer to the band of frequencies over which the antenna can functionally operate. Throughput, on the other hand, will be used to specifically refer to the amount of data that can be transferred (e.g., the number of bits being streamed per unit time).

In general, depending on the antenna design, the throughput provided by a particular antenna array is governed by its overall size and/or the number of radiating elements included in the antenna array. On a microstrip antenna, for example, the number of radiating elements is directly related to the throughput of the antenna. The size of the radiating elements, however, is closely related to the frequency band within which the antenna is intended to operate. Thus, for a given frequency (or rather, wavelength) the size of each radiating element is relatively fixed if optimum efficiency is desired. In many cases, smaller elements can be used to reduce antenna size or increase the number of radiating elements, but at the expense of some efficiency. For relatively low-frequency cellular communications (e.g., 600-700 MHz), each "patch" radiator may be on the order of about 4".

Figure 1:
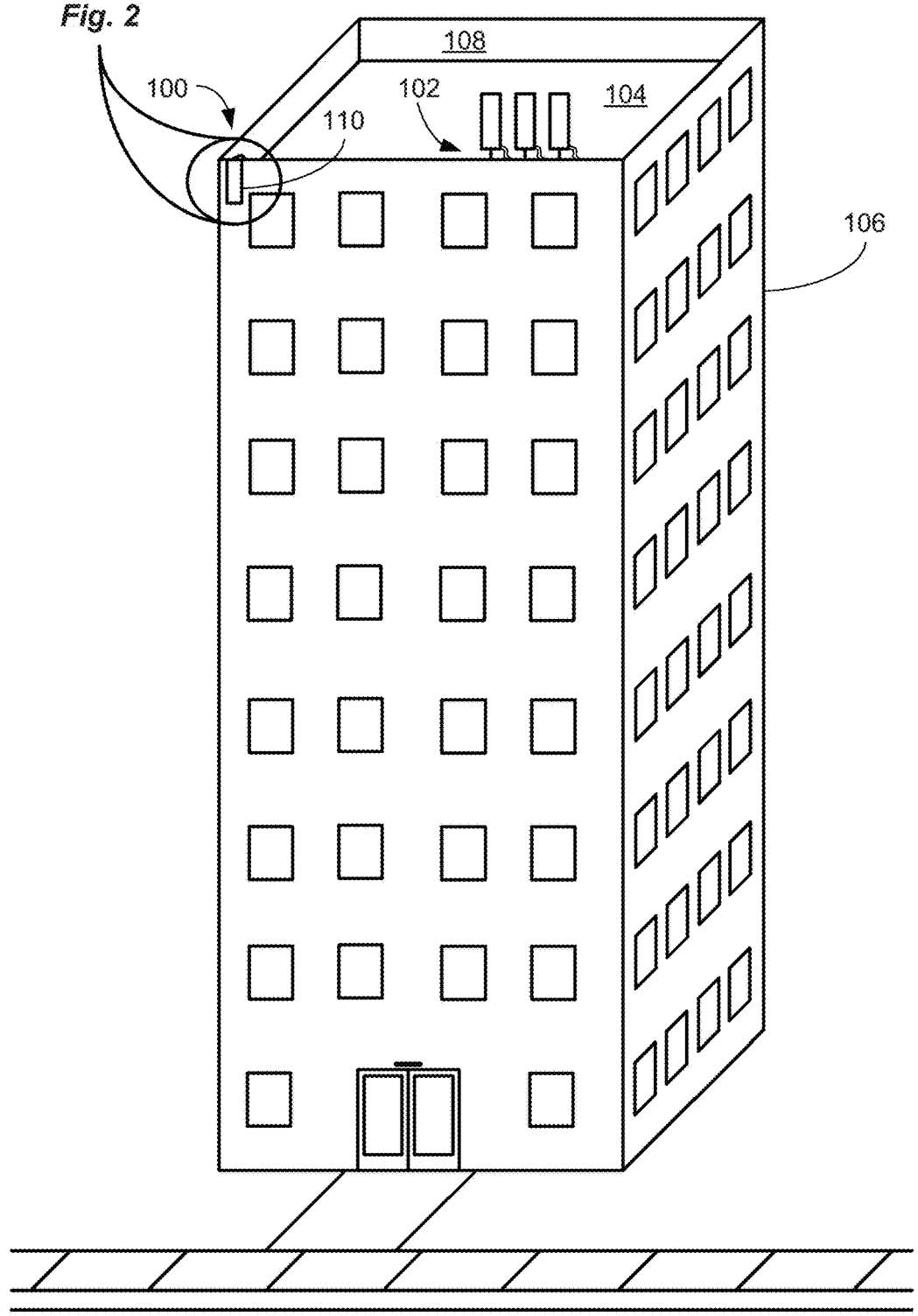
FIG. 1 depicts an example of a low-profile antenna system mounted to a building, in accordance with some examples of the present disclosure.

Thus, increasing the throughput of the antenna is generally achieved by increasing the size of the antenna array. As shown in FIG. 1, from several standpoints, having large, broadside antenna panels 102 mounted on the roof 104 of a building 106 can be undesirable, however. For performance reasons, for example, the antennas 102 are often mounted above the parapet 108 of the building 106 to avoid the parapet 108 blocking the signals from the antennas 102. As such, the antenna panels 102 interrupt the shape of the building and may upset what are otherwise clean lines on the building 106. In addition, the larger the antennas 102, the larger the sail area, the larger the structure required to support the antennas 102. Thus, large antennas 102 may require additional superstructure, building reinforcement, and other modifications to support their weight and resist wind forces, among other things.

To this end, examples of the present disclosure can comprise systems and methods for surface-mounting low profile antennas 110 on buildings 106 and other structures. The low-profile antennas 110 can be mounted on external walls, windows, and other exterior surfaces and can be designed to mimic the appearance of the mounting location. Thus, the low-profile antennas 110 can be colored to match the mounting surface (e.g., concrete, brick, or painted surfaces) or can be substantially transparent for mounting on windows.

Figure 2:
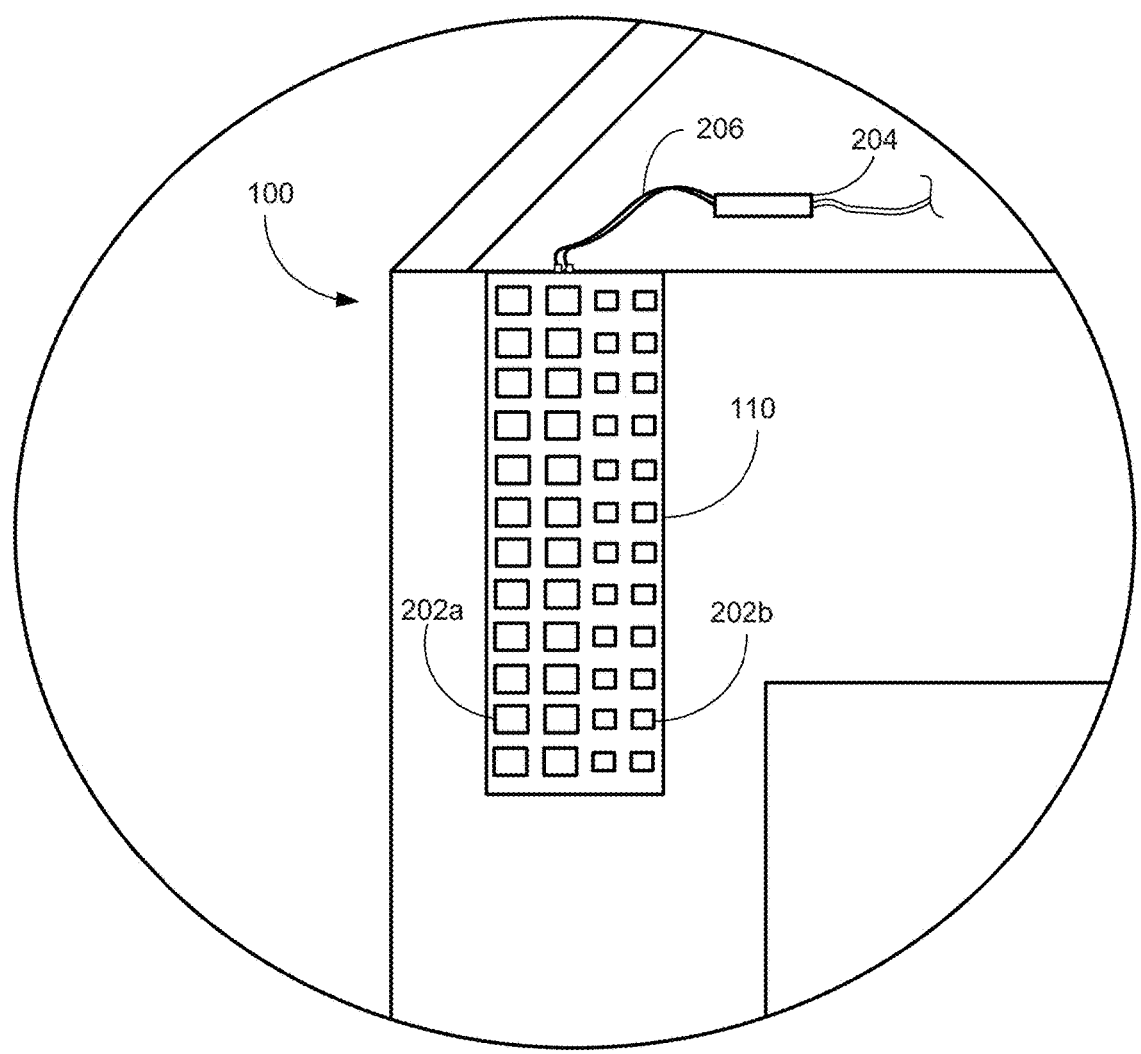
FIG. 2 is a detailed view of the low-profile antenna system of FIG. 1, in accordance with some examples of the present disclosure.
Figure 3:
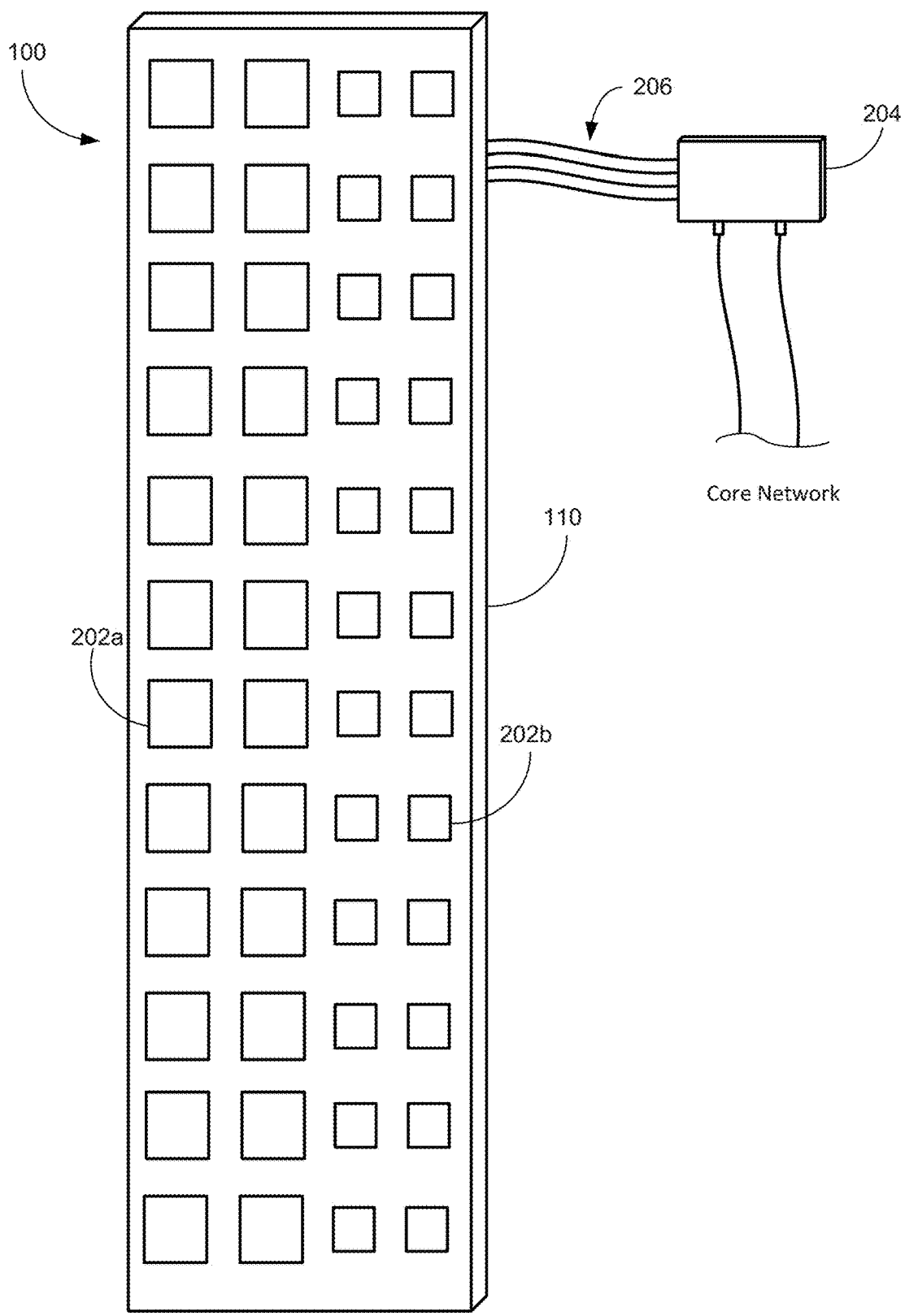
FIG. 3 is a detailed view of the low-profile antenna system of FIG. 1 including a duplexer and a plurality of cables, in accordance with some examples of the present disclosure.

As shown in FIGS. 1-3, the system 100 can be mounted on the side of the building 106, for example, to significantly reduce the sail area of the system 100 and virtually eliminate wind resistance. The system 100 can comprise a low-profile antenna 110 with a plurality of printed circuit radiating elements 202 configured to send and/or receive at one or more frequencies. In some examples, the system 100 can include a plurality of uplink radiating elements 202*a* designed to receive at cellular uplink frequencies (e.g., 1710-1755 MHz) and plurality of downlink radiating elements 202*b* designed to send at downlink frequencies (e.g., 2110-2155 MHz) on a single low-profile antenna 110.

In this configuration, the system 100 can also include a duplexer 204. The duplexer 204 can be used to separate out the various frequencies to enable duplex communications. Because the relatively high-powered downlink frequencies (e.g., the signal being sent from the network to the user equipment (UE)) have a tendency to "drown-out" the weaker uplink frequencies (from the UE to the base station), the duplexer 204 can be used to isolate the uplink frequencies and filter out the downlink frequencies. The duplexer 204, in turn, can be connected to a transceiver connected to the cellular backbone via one or more backhaul facilities (e.g., Ethernet, microwave, etc.)

Generally, duplexers 204 are relatively bulky, however. As a result, in some configurations, the duplexer 204 can be remotely mounted on the roof 104, or other location, and connected to the system 100 via one or more cables 206 (e.g., coaxial cables). In this manner, this visible portion of the system 100—the low-profile antenna 110—can be thin and light.

Because the low-profile antenna 110 is thin and light, it can be mounted to the building 106 with little, or no, modification to the building 106. In some examples, as discussed below, the system 100 may even be mounted to the building 106 with a removable adhesive. See, FIG. 4, below. In addition, because they are low-profile, the low-profile antennas 110 are unobtrusive. Indeed, the low-profile antenna 110 may be color-matched to the building or even transparent/translucent for window mounting. In either case, the low-profile antenna 110 can be unobtrusive and, in some cases, practically invisible.

Figure 4:
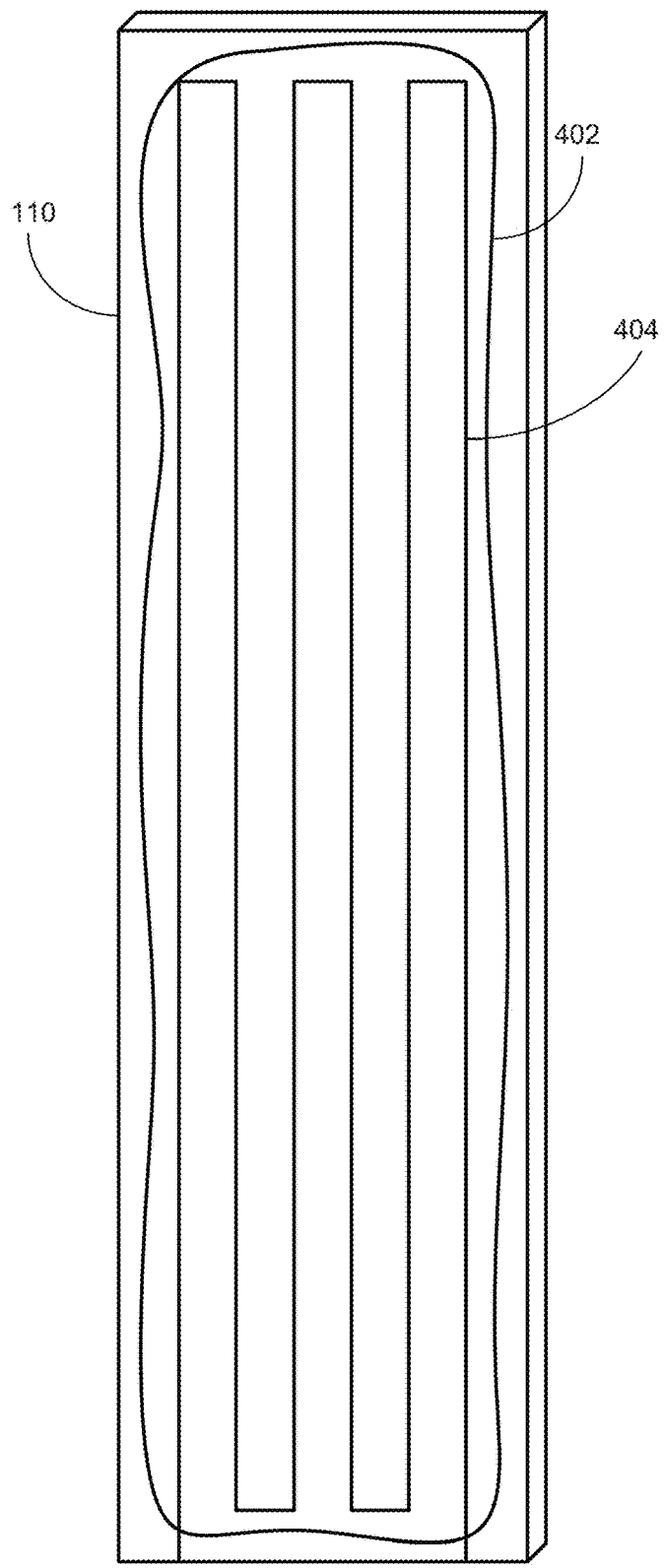
FIG. 4 is a rear view of an example of a low-profile antenna with a heat-sensitive adhesive and one or more heating elements, in accordance with some examples of the present disclosure.

As shown in FIG. 4, in some examples, the low-profile antenna 110 can be mounted to the building 106 with adhesive 402. The adhesive 402 can comprise, for example, an epoxy, adhesive tape, or pressure sensitive adhesive. In some examples, the adhesive 402 can comprise a temperature sensitive adhesive. In this configuration, the low-profile antenna 110 can also include one or more heating elements 404. The temperature sensitive adhesive can become malleable above a pre-determined temperature—preferably suitably above possible maximum temperatures on the building 106—for example, and then re-solidify at ambient temperatures.

In this configuration, the low-profile antenna 110 can be mounted to the building 106 using pressure, for example, or heating the adhesive 402 with the heating elements 404 to the predetermined temperature. Once cooled, the adhesive 402 can firmly adhere the low-profile antenna 110 to the building 106. If the low-profile antenna 110 needs to be removed for repair or replacement, for example, the heating elements 404 can be reenergized to reheat the adhesive 402. Once reheated, the adhesive 402 can enable the low-profile antenna 110 to be easily removed from the building 106 without damage (e.g., without pulling off paint, plaster, siding, or other components of the building 106), such that little or no "touching up" is required. In this manner, the system 100 can be mounted on the building 106 without drilling holes in the building 106, for example, or making other permanent changes.

Figure 5B:
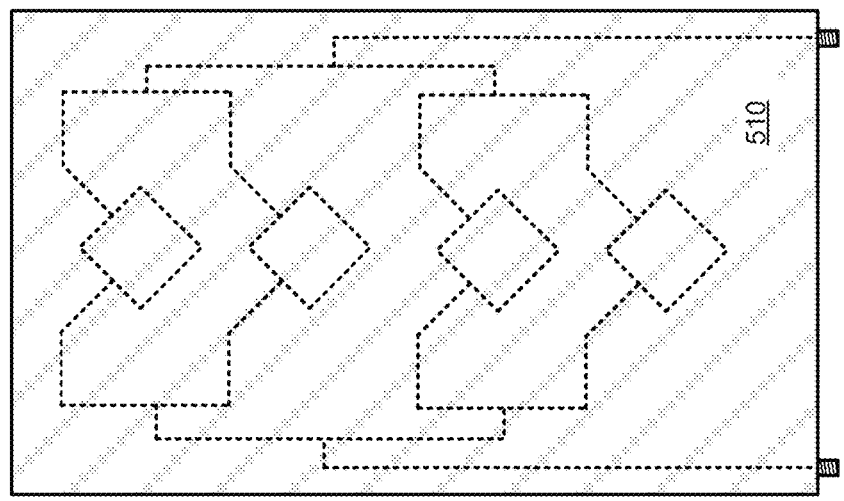
FIGS. 5A and 5B are front and rear views, respectively, of an example of a low-profile antenna for use the system of FIG. 1, in accordance with some examples of the present disclosure.
Figure 5A:
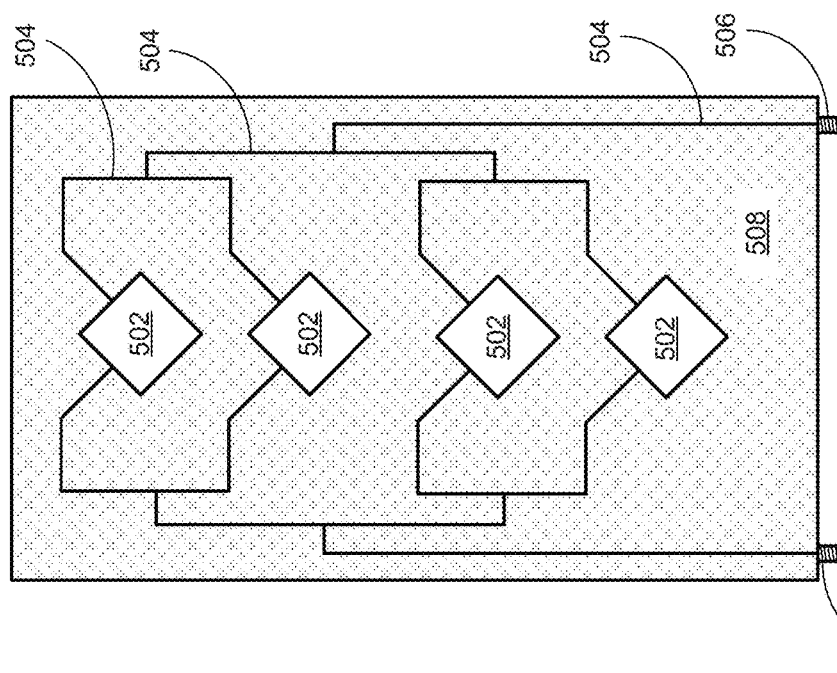

As shown in FIGS. 5A (front view) and 5B (rear view), the low-profile antenna 110 can comprise a plurality of copper microstrip "patch" radiating elements 502. The radiating elements 502 can be sized and shaped to transmit and/or receive at the desired frequency. The overall throughput of the low-profile antenna 110 can be increased by increasing the number of radiating elements 502. In some examples, the radiating elements 502 can be connected with a copper microstrip feed network, or feed "traces" 504, to one or more RF connectors 506 (e.g., coaxial connectors) to enable the low-profile antenna 110 to be connected to the aforementioned cables 206. Of course, any type of cables 206 and RF connectors 506 capable of carrying RF signals could be used and are contemplated herein.

The radiating elements 502 and feed lines 504 can be etched, printed, or otherwise created on the front of a dielectric substrate 508. The dielectric substrate 508 can comprise any of a number of suitable dielectric materials such as, for example, FR4, RT Duroid 6002, RO4730, or RO3200. In some examples the dielectric substrate 508 can also comprise a copper clad fiberglass or copper clad Teflon® fiberglass, among other things. The back of the dielectric substrate 508 can be clad in a solid or patterned copper, silver, or other suitable material to form a ground plane 510.

Figure 5C:
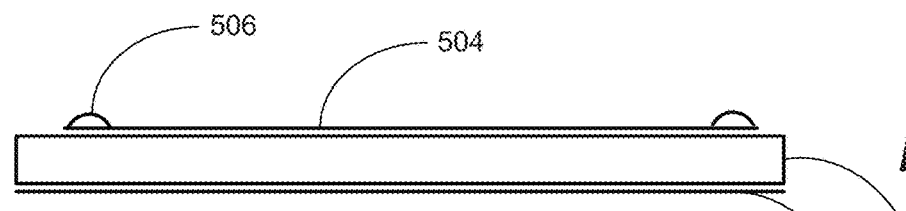
FIGS. 5C and 5D are top and side views, respectively of the example low-profile antenna of FIGS. 5A and 5B, in accordance with some examples of the present disclosure.
Figure 5D:
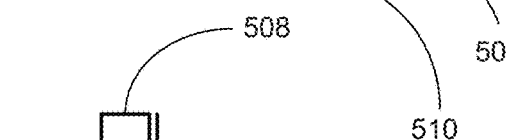

As shown in FIGS. 5C (top view) and 5D (side view) due to its design, the low-profile antenna 110 can be very thin and light. This can enable the low-profile antenna 110 to be mounted on the building 106, or other structure, with little or no modification to the building 106. For simplicity, the low-profile antenna 110 is shown as a flat panel. It should be noted, however, that it is not necessary for the low-profile antenna 110 to be planar. The low-profile antenna 110 can be curved, for example, to enable structures other than conventional buildings to be used. All that is required is sufficient surface area to mount the low-profile antenna 110. Indeed, in some examples, the low-profile antenna 110 may be mounted to the building 106 with an adhesive 402 obviating the need to even drill fastening holes in the building 106. This maintains the environmental envelope of the building 106 and can prevent water and wind infiltration, damage to the façade, rust and rot, and other associated problems.

Figure 6A:
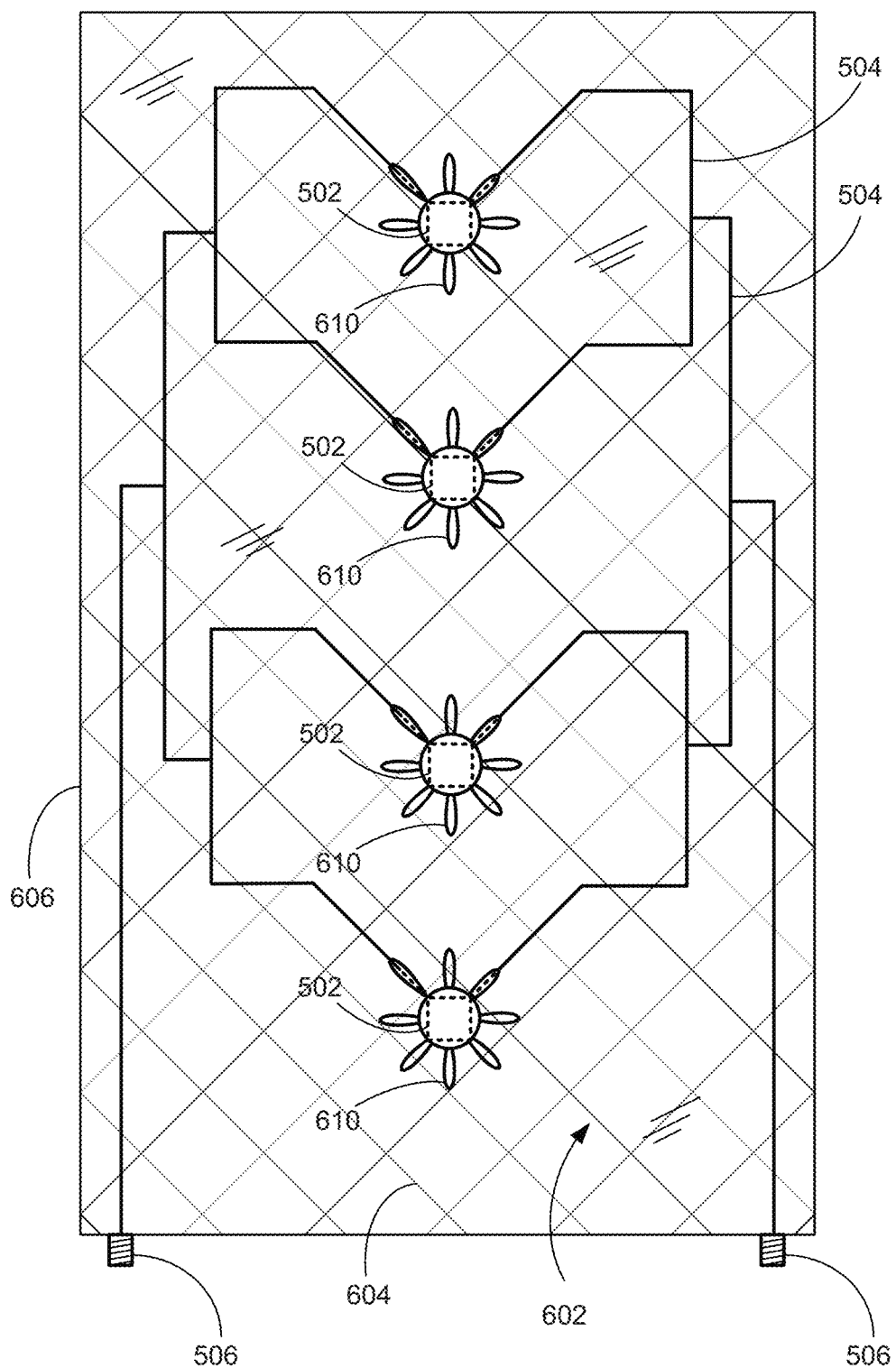
FIG. 6A depicts an example of a transparent low-profile antenna, in accordance with some examples of the present disclosure.

In some examples, as shown in FIG. 6A, the low-profile antenna 110 can be largely transparent to enable the low-profile antenna 110 to be mounted on windows and other visible locations. This configuration is similar to the configuration described above in FIGS. 5A-5D. In this configuration, rather than using a solid ground plane 510, however, the ground plane 602 can comprise a plurality of thin metal ground traces 604 disposed on a first side of a transparent (or translucent) substrate 606. In this manner, the low-profile antenna 110 can be installed on a window 608, for example, yet permit light and allow outward visibility.

In some examples, to further "hide" the low-profile antenna 110, each radiating element 502 can be covered, or camouflaged, by an aesthetic element 610. The aesthetic element 610 can comprise, for example, a sticker or decal, paint, etching, or other non-metallic feature designed to partially, or completely, cover the radiating element 502, or otherwise obscure the radiating element from view. In some cases, rather than covering up the radiating element 502, the aesthetic element 610 can incorporate the radiating element 502 into the graphic. In other words, a square radiating element 502 can form the box of a present or the bed of a dump truck, for example, to enable the low-profile antenna 110 to be not only hidden, but incorporated into the theme of the building 106.

Figure 6B:
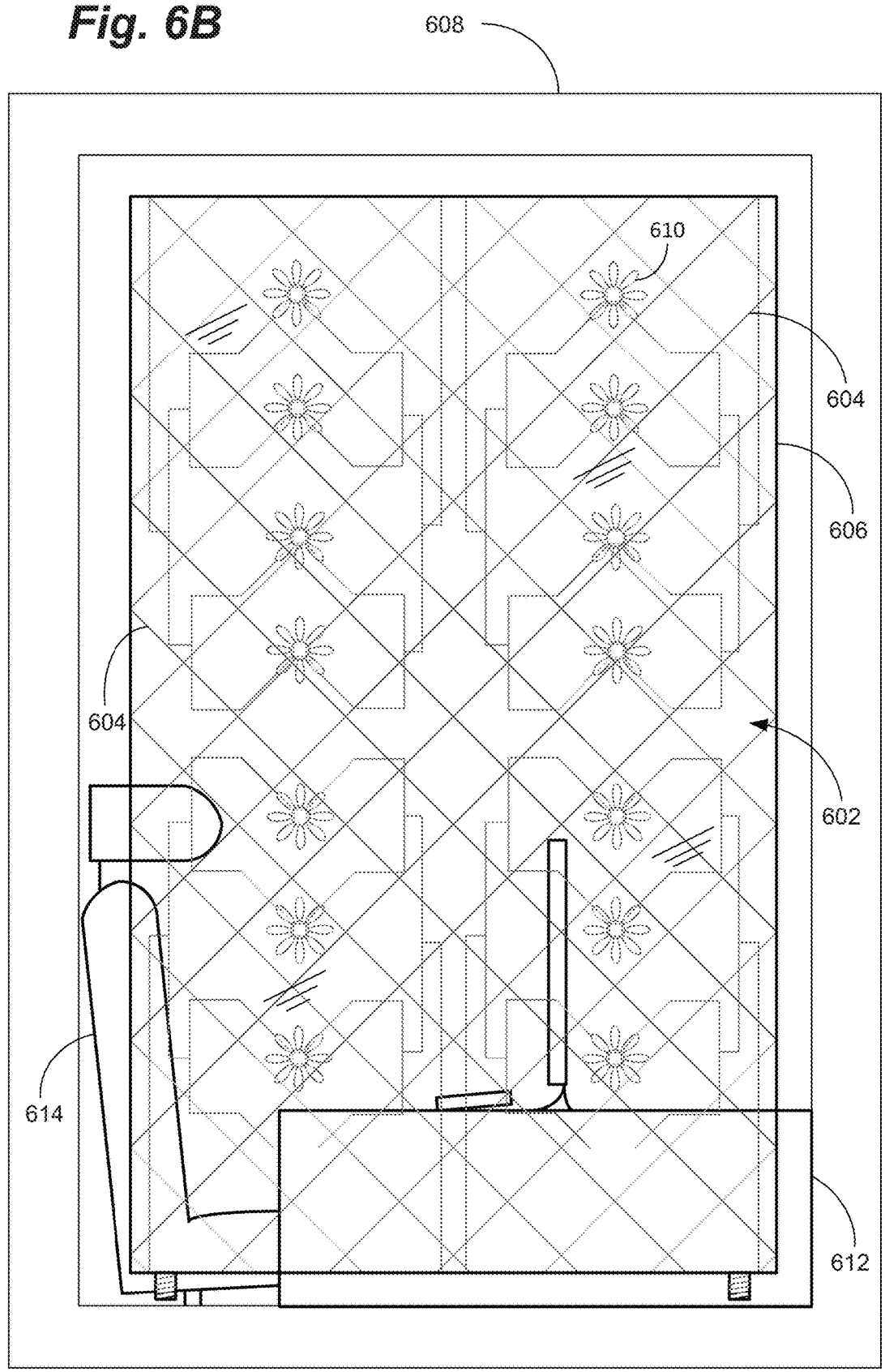
FIG. 6B depicts the transparent low-profile antenna of FIG. 6A installed on the window of an office, in accordance with some examples of the present disclosure.

As shown in FIG. 6B, the low-profile antenna 110 can cover a portion of the window 608, yet the desk 612, chair 614, and other items in the office are still clearly visible. Indeed, the ground traces 604 can be so thin and the radiating elements 502 so small as to almost be invisible to the naked eye, yet provide the necessary ground plane and resonance, respectively. The ground traces 604 shown in FIG. 6 are exaggerated for clarity. In reality, at most relevant cellular frequencies, the ground traces 604 would likely be invisible in FIG. 6 at the scale used in the drawing.

In some examples, the size, shape, and spacing of both the radiating elements 502 and the ground traces 604 can be dictated largely by the desired frequency response and aesthetic considerations; while the aesthetic elements 610 can be any desired shape (e.g., flowers (shown), swirls, flags, etc.), or almost any other shape, as long as they provide the desired camouflage.

In this manner, the radiating elements 502/aesthetic elements 610 need not be purely functional, but can also include decorative or aesthetic elements, which may be particularly useful, for example, in a window-mounted application. The radiating element 502 may be square, for example, because it is easy to design for a particular frequency, easy to manufacture, and provides good resonance. In this case, however, the radiating elements 502 can also include the aesthetic element 610. This can enable the low-profile antenna 110 to be installed in locations where it is visible to, for example, occupants of the building 106 or passers-by.

As used herein, therefore, the terms "aesthetic" and "decorative" with respect to the aesthetic elements 610 is used to indicate shapes that are not purely functional (e.g., a square), but also have aesthetic or decorative functions (e.g., a flower, star, flag, fish, etc.) with shapes that are at least partially divorced from the electronic functions of the radiating elements 502. So, each radiating element 502 may be covered, for example, with a sticker or decal on the low-profile antenna 110 or the aesthetic element 610 can be installed on the window in the appropriate locations.

The ground traces 604 need only to be close enough together to act as a ground plane. A general rule-of-thumb is that ground traces 604 space ⅛ of the wavelength of the desired frequency will act as a solid ground plane; though, in general, the closer the ground traces 604 the better the performance. To this end, the density of the cross-hatch grid lines can be higher relative to the size of the radiating elements to provide an effective ground plane for proper radiation pattern; but, the thickness of each grid line can be very fine to reduce the overall visual impact.

In the case of relatively low frequency cellular communications (e.g., 700 MHz), the wavelength is actually quite long (~16.9 inches). In this frequency domain, therefore, copper traces 2 inches apart would likely be sufficient. Of course, all things being equal, longer wavelengths also require larger antennas, which somewhat offsets this benefit. It should be noted, however, that with a patch antenna, it is both wavelength and dielectric loading that matters, which can result in somewhat smaller radiating elements 502.

Figure 7:
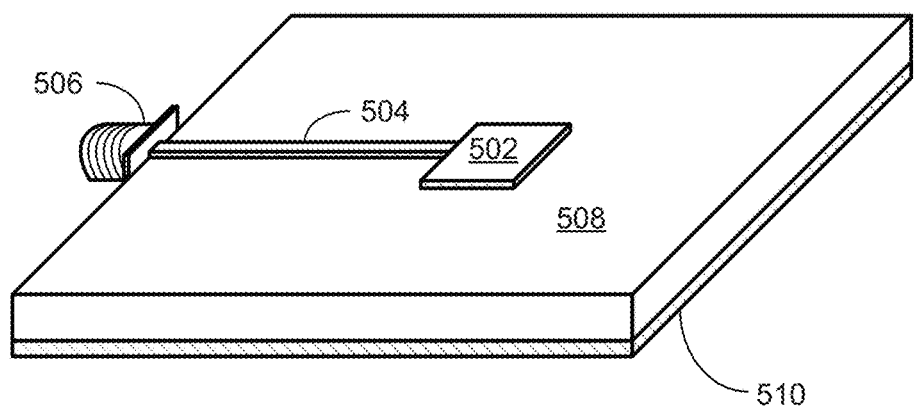
FIGS. 7, 8, and 9 depict various examples of configurations for components of the low-profile antenna, in accordance with some examples of the present disclosure.
Figure 8:
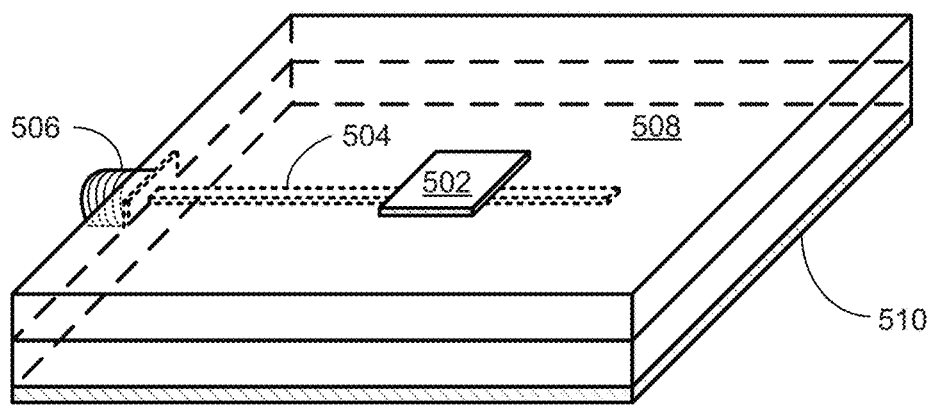
Figure 9:
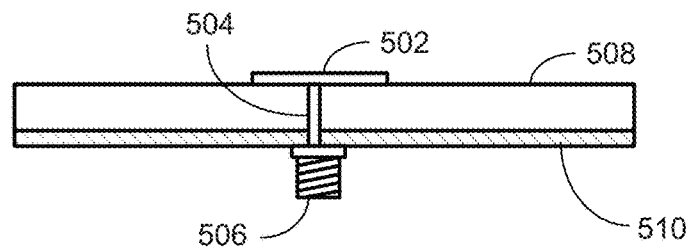

As shown in FIGS. 7-9, the configuration of the low-profile antenna 110 can be chosen based on the application and mounting location. In other words, the low-profile antenna 110 may be surface mounted in different locations, edge mounted, or tuned for various frequency responses. To this end, the relationship between the radiating element 502, the feed line 504 and the RF connectors 506, among other things, can be tailored to, for example, the installation location, the installation method (e.g., adhesives or fasteners, brackets, etc.), and the desired frequency response.

As shown in FIG. 7, in some examples, the radiating element 502 and feed line 504 can be disposed on the surface of the dielectric substrate 508, with the RF connector 506 disposed on one edge of the dielectric substrate 508. As shown, this enables direct connection between these components 502, 504, 506, which may improve performance, reduce noise, and decrease manufacturing costs. In addition, this configuration enables the low-profile antenna 110 to be surface mounted with the ground plane 510 against the mounting surface. As shown in FIG. 1, this configuration can enable the low-profile antenna 110 to be mounted on the side of the building 106, for example, with the cables 206 running up and over the parapet 108 to the remote mounted duplexer 204.

As shown in FIG. 8, in some examples, the low-profile antenna 110 can include two dielectric substrates 508*a*, 508*b*. In this configuration, the radiating element 502 can be disposed on a first substrate 508*a* and the feed line 504 can be located on a second dielectric substrate 508*b* and connected to the RF connector 506, with an inductive coupling between the feed line 504 and the radiating element 502. The RF connector 506, in turn, can be mounted on the side of the second dielectric substrate 508*b* and connected to the feed line 504. Again, this configuration may be useful for surface mounting, but this configuration can enable the properties of the low-profile antenna 110 to be tuned for various parameters.

As shown in FIG. 9, in some examples, the radiating element 502 can be disposed on the substrate, with the feed line 504 feeding down through the dielectric substrate 508 and ground plane 510 to the RF connector 506 mounted on the ground plane 510. This configuration may be useful for surface mounting the low-profile antenna 110 to a window, for example, to enable the RF connector 506 to protrude through a small hole in the window. In this configuration, the low-profile antenna 110 can be flush mounted on a window, for example, with the cables 206 and duplexer 204 located inside the building. The hole can be easily sealed with silicone, caulk, or other suitable material, with the cables 206 and duplexer 204 protected from the elements inside the building. This may reduce maintenance costs, for example, and improve performance, among other things. Of course, the location of the RF connector 506 and other components is somewhat arbitrary and can be changed for different performance characteristics, installation locations, and other factors.

Figures 10A, 10B:
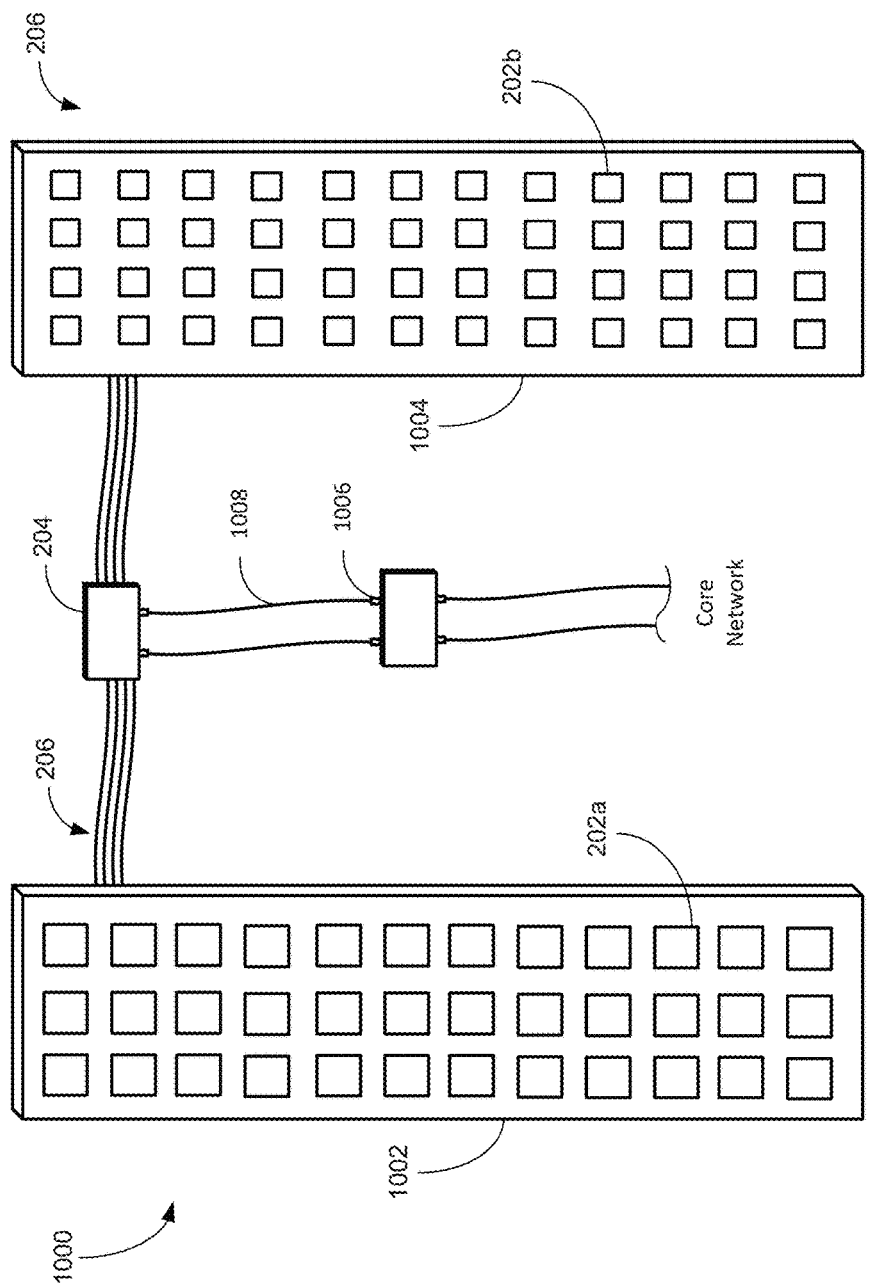
FIGS. 10A and 10B depict examples of a low-profile uplink and downlink antenna, respectively, in accordance with some examples of the present disclosure.

As shown in FIGS. 10A and 10B, in some examples, to reduce interference between uplink and downlink transmissions, a separate uplink/downlink system 1000 can be used that employs separate uplink 1002 and downlink 1004 low-profile antennas. As mentioned above, the downlink transmissions from the system 100 to UEs in the area is generally significantly more powerful than the uplink signals being sent from the UEs to the system 100. Downlink transmissions are intended to provide sufficient strength (in dB) to maintain acceptable performance on the UEs, even UEs at the periphery of the system's range. UEs transmit at very low power settings, on the other hand, to extend batter life and reduce interference, among other things.

Thus, downlink transmissions tend to drown out uplink transmissions to some extent. To overcome this tendency, the system 100 can include a duplexer 204, which essentially filters out unwanted frequencies. Because the uplink transmissions are so weak, very sensitive duplexers 204 are generally used, but these duplexers 204 tend to be relatively expensive and bulky. To the end, in some examples, the system 1000 can include a separate uplink antenna 1002 and downlink antenna 1004. In this configuration, while a duplexer 204 can still be installed to filter out unwanted frequencies, the amount of noise on each antenna 1002, 1004 is significantly reduced.

As shown in FIGS. 10A and 10B, the uplink antenna 1002 can include printed circuit radiating elements 502 designed to resonate at the relevant uplink frequencies (e.g., 890-915 MHz), while the downlink antenna 1004 can include printed circuit radiating elements 502 designed to resonate at the relevant downlink frequencies (e.g., 935-960 MHz). Thus, the printed circuit radiating elements 502 on each antenna 1002, 1004 may be constant across the surface of the particular antenna 1002, 1004, but each antenna 1002, 1004 can have printed circuit radiating elements 502 that are different sizes or shapes when compared to each other.

This configuration may be particularly useful in communications systems (e.g., Global System for Mobile Communications, or GSM) that use frequency division duplex (FDD) technology and have uplink and downlink frequencies that are relatively close together in the frequency spectrum. Using the separate antennas 1002, 1004 reduces the amount of "cross-talk" on each antenna which, in turn, reduces the need for a very sensitive duplexer 204. This may enable the duplexer 204 to be smaller and/or less expensive and improve transmission quality (e.g., reduce errors). As shown, the duplexer 204 can be remotely mounted—as opposed to being part of the antennas 1002, 1004—to maintain the low-profile of the antennas 1002, 1004 and/or ease installations.

In some examples, as discussed in more detail below with respect to FIGS. 11, 12A, and 12B, the systems 100, 1000 can also include one or more phase shifters 1006. Phase shifters 1006 can be used to steer the beam from the antennas 110, 1002, 1004 to provide the desired coverage pattern. The phase shifter 1006 can be used to steer the beam in azimuth and elevation to cover, for example, a transit terminal, park, or office building where additional throughput is desired. Like the duplexer 204, the phase shifter 1006 can be mounted remotely and connected in line with one or more cables 1008 to maintain the low profile of the antennas. It should be noted that, while the phase shifter 1006 is shown in conjunction with the separate uplink/downlink antenna system 1000, the phase shifter 1006 is equally applicable to other configurations shown herein.

In addition, as mentioned above, because of the low-profile nature of the system 1000, the system 1000 has very little visual impact on the building 106. As a result, multiple antennas 110, 1002, 1004 can be mounted on the building 106 to improve throughput and/or reduce interference without significantly affecting the aesthetics or structure of the building 106. Indeed, the antennas 110, 1002, 1004 could be disguised as building features (e.g., a shutter or part of an applique) or simply color-matched to the building 106, making the antennas 110, 1002, 1004 all but invisible.

Figure 11:
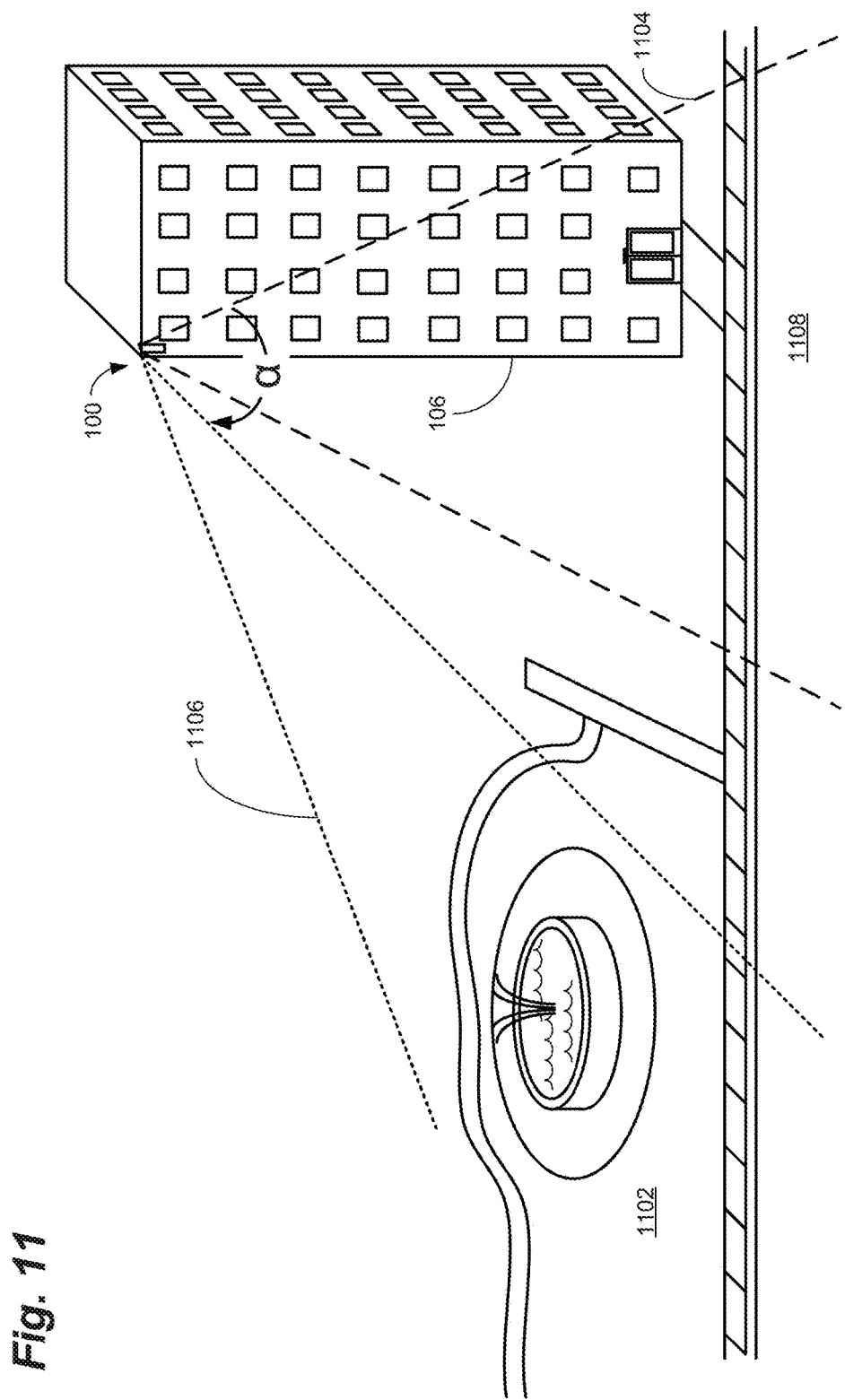
FIG. 11 depicts an example of beam steering the signals from a low-profile antenna, in accordance with some examples of the present disclosure.

As shown in FIG. 11, in some examples, mounting the system 100 flush to a building may be advantageous for a number of reasons. Flush-mounting the system 100 reduces the visual impact of the system 100, for example, and also significantly reduces the sail area of the system 100. When compared to the aforementioned broadside antennas 102, for example, the sail area of the system 100 is reduced from the entire surface area of both sides of the panel antenna 102 to just the edges. As, mentioned above, this can obviate the need for special mounting brackets, building reinforcement, and in some cases, even fasteners. Thus, in some cases, the system 100 can be mounted without even drilling holes in the building 106.

Flush mounting the system 100, however, limits the orientation of the system 100 to the orientations provided by the walls of the building 106 (i.e., an antenna mounted flat to a wall "faces" the same direction as the wall). In many cases, therefore, the system 100 can be mounted vertically in one of four directions—the four directions the walls of the building 106 faces. Of course, some buildings have facets, more than four walls, or non-vertical walls; regardless, the system 100 is somewhat fixed in its orientation. This means that, without some sort of steering, the signals from the system 100 tend to propagate outward from the building in a substantially symmetrical pattern both vertically and horizontally. This may not be particularly useful, however, if the building 106 faces another nearby building or a low traffic area (e.g., an empty lot or warehouse district).

To this end, as shown in FIG. 11, in some examples, the system 100 can also use beam-steering techniques to move the coverage area of the system 100 to a desired area, such as, for example, a park 1102 (shown), arena, or shopping area near the building 106. Thus, while the natural propagation pattern 1104 of the system 100 may be outward from the building 106 covering a sidewalk and/or street, the steered propagation pattern 1106 can cover a more desirable, higher-density, and/or higher traffic area. Using phase shifts between the various printed circuit radiating elements 502, the steered propagation pattern 1106 can be shift left or right and up or down. In this case, the steered pattern 1106 has been shifted right through an angle, a, and/or down to cover the park 1102.

Figure 12A:
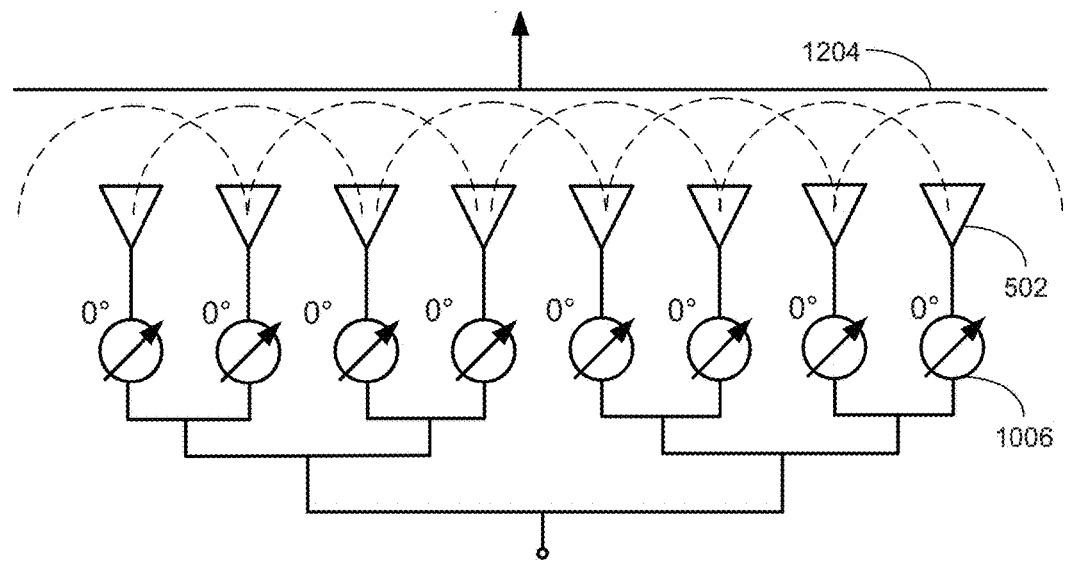
FIGS. 12A and 12B depict conventional and beam-steered propagation patterns, respectively, from an antenna, in accordance with some examples of the present disclosure.
Figure 12B:
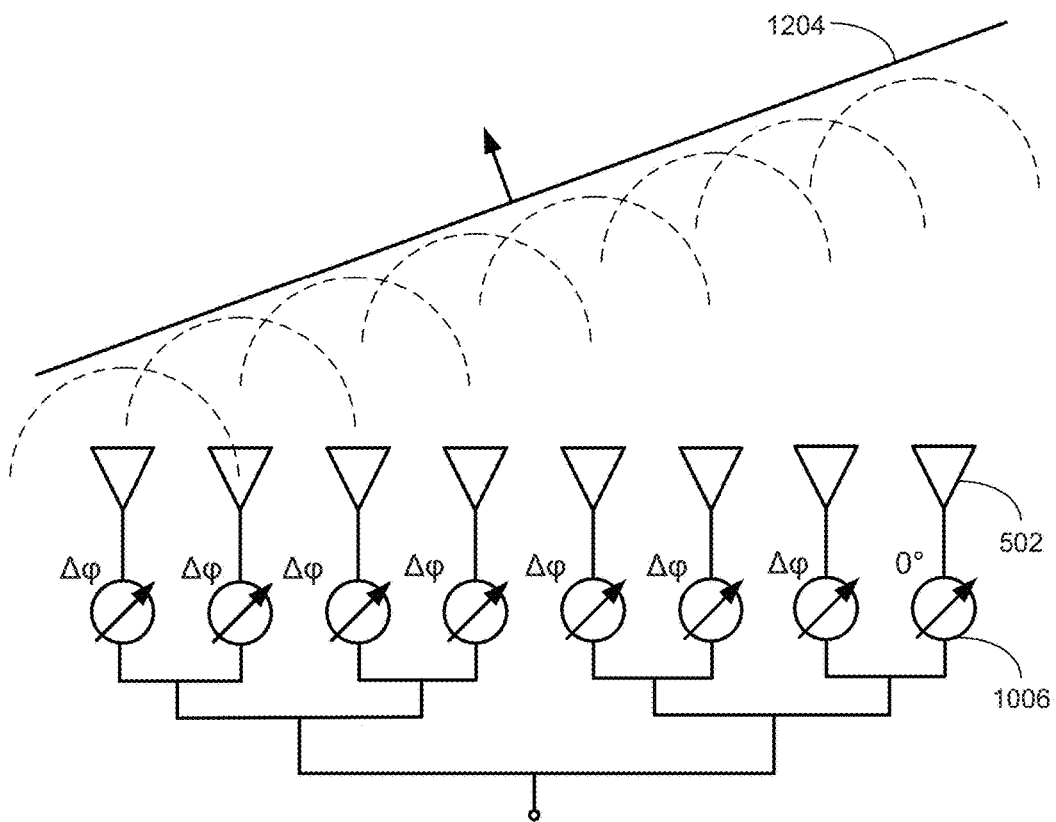

As shown in FIG. 12A, when a signal is transmitted by the printed circuit radiating elements 502 in phase—e.g., the system 100 does not have phase shifters 1006 or the phase shifters 1006 are all set to be in phase—the wave front 1204 (i.e., the area of greatest power radiating from the low-profile antenna 110) is perpendicular to the face of the low-profile antenna 110. In this configuration, the wave propagates from the antenna substantially symmetrically both elevation and azimuth. So, as mentioned above, the wave propagates out from the building 106 at about the same heading as the wall faces on which the system 100 is mounted. As shown in FIG. 12B, on the other hand, shifting the output of each radiating element 502 through a phase angle, $\varphi$, using the phase shifters 1006 can enable the wave front 1204 from the low-profile antenna 110 to be steered in both elevation and azimuth. As shown in FIG. 11, in this example, the natural propagation pattern 1104 can be steered right through angle $\alpha$ from the area 1108 in front of the building 106 to the park 1102 to the right of the building 106. To improve signal strength in the park 1102, the signal can also be steered downward to recover the portion of the signal that would otherwise (naturally) propagate upward from the system 100 out of use range from the ground. In this manner, the limitations caused by surface mounting the system 100 can be overcome to provide coverage in the desired area (e.g., the park 1102).

Figure 13:
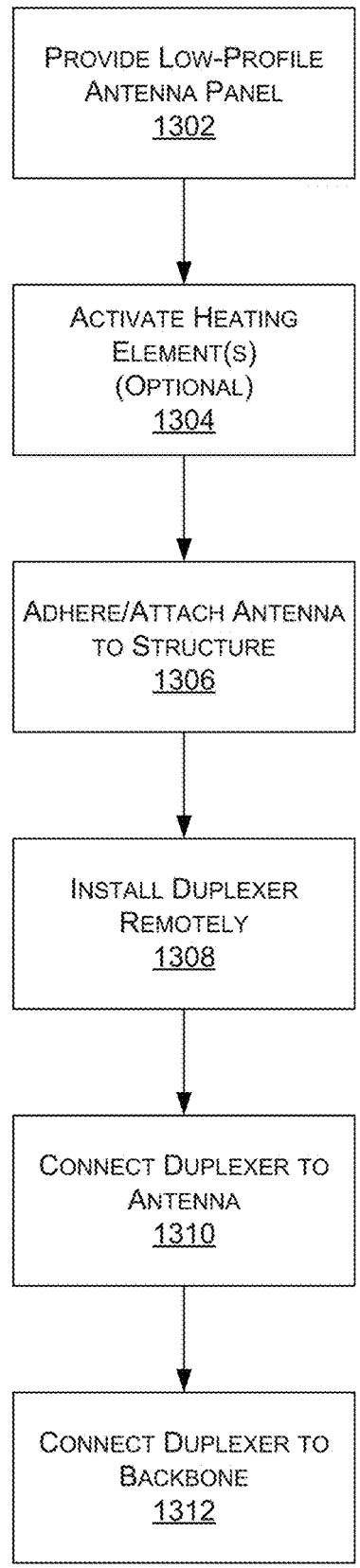
FIG. 13 depicts an example of a method for installing the system of FIG. 1, in accordance with some examples of the present disclosure.

As shown in FIG. 13, examples of the present disclosure can also comprise a method 1300 for installing a low-profile antenna system on a structure. As mentioned above, due to the low-profile nature of the low-profile antenna 110, the system 100 does not require building reinforcement, heavy superstructures, or other modifications for installation. Indeed, in some examples, the system 100 can be installed with little, or no, modifications to the buildings. This can reduce, or eliminate, drilling holes in the building 106, for example, which represent penetrations from a weatherproofing standpoint and can cause water and wind infiltration, among other things.

At 1302, therefore, the installer can provide the low-profile antenna 110 to the installation location. As shown in FIG. 1, this can include the roof 104 or wall of a building 106, a billboard, lamppost, or any other suitable structure. In some examples, the structure may preferably be relatively tall to increase the coverage area and/or reduce interference from nearby objects. Due to the low-profile and light weight nature of the system 100, however, structural requirements are minimal when compared, for example, to a traditional cell tower.

At 1304, optionally, the installer can activate one or more heating elements 404 to soften or activate one or more adhesives 402 on the low-profile antenna 110. Of course, this step is optional because the adhesive could be pressure sensitive upon installation, for example, and heat sensitive for removal. The adhesive 402 could also be removable in the same manner as other pressure sensitive adhesives where the adhesive is stretched to remove it without damage to the surface. Of course, other adhesives could also be used and are contemplated herein.

At 1306, the low-profile antenna 110 can be attached to the mounting surface. In the case of an adhesive, the low-profile antenna 110 may simply be pressed into place in the desired location. In other configurations, the installer may use wall anchors, toggle bolts, brackets, or other mechanisms. Importantly, because the low-profile antenna 110 is low profile and relatively light weight, no significant structure is required for installation. Thus, unlike conventional cell towers, for example, the roof 104 does not have to be reinforced, nor is any significant superstructure required in most configurations. This is further aided by the fact that the low-profile antenna 110 has a very small sail area, reducing wind loads.

At 1308, the installer can install the duplexer 204 remotely (e.g., on the roof or inside the building). This enables the relatively heavy and/or bulky duplexer 204 to be mounted on the roof 104, for example, and maintains the slim profile of the low-profile antenna 110. As mentioned above, this can also enable the duplexer 204 and other electronics (if any) to be installed inside the building 106 out of the weather.

At 1310, the installer can connect the duplexer 204 to the low-profile antenna 110 using the cables 206, or other suitable method. In the case of coaxial cables, this can be as simply as screwing one end of the cable 206 onto the RF connector 506 on the low-profile antenna 110. In other configurations, the system 100 can use any sort of cable capable of carrying RF communications. The cables 206 can be weatherproof, as necessary, to prevent corrosion and water infiltration, among other things. Of course, in some examples, the cables 206 can be terminated in situ by the installer.

At 1312, the installer can attach the duplexer 204 to the cellular backbone, or "core network." In the case of cellular communications, this can include connecting the duplexer 204 to a cellular transceiver, microwave transceiver, Ethernet cable, or other cellular backhaul method to connect users to the cellular backbone as with a conventions cell tower. As mentioned above, the system 100 enables additional throughput to be provided in the desired areas with little, or no, aesthetic and/or structural impact to the building 106, or other structure. Indeed, the low-profile antenna 110 can be color-matched, or otherwise camouflaged, to match the building, while the remaining components (e.g., the duplexer 204) can be mounted out of sight, making the system 100 call but invisible.

Figure 14:
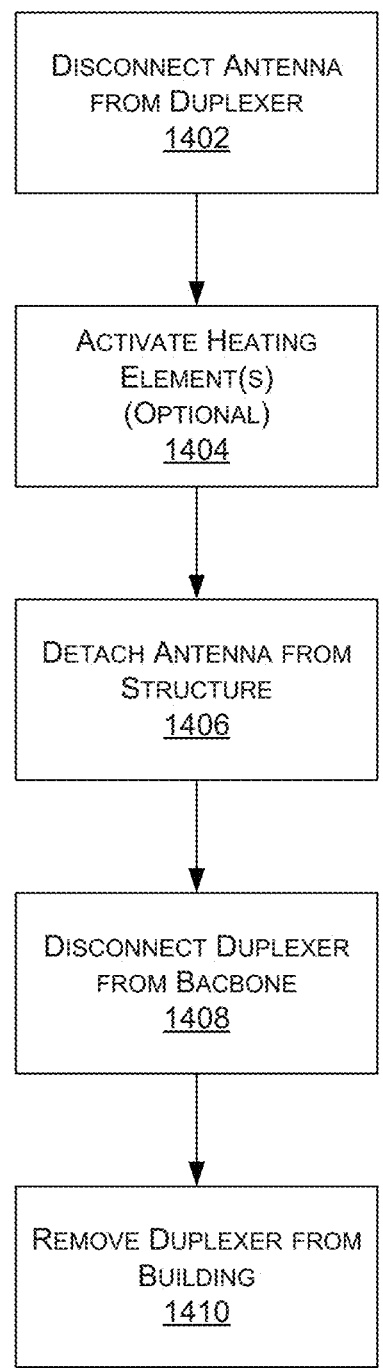
FIG. 14 depicts an example of a method for removing the system of FIG. 1, in accordance with some examples of the present disclosure.

As shown in FIG. 14, the features that make the system 100 easy to install also make the system 100 easy to remove. Thus, if traffic patterns shift or building ownership changes, for example, the system 100 can be removed from the building 106 with little, or no, indication that the system 100 was ever installed. Indeed, at most, filling some small mounting holes in the building 106 and touching up the paint will return the building 106 to its original condition.

At 1402, the installer can disconnect the low-profile antenna 110 from the duplexer 204. Depending on the connections used, this can be as simple as unscrewing one or more coaxial cables or unplugging one or more Ethernet (e.g., RJ45) cables.

At 1404, if the low-profile antenna 110 was installed using heat-sensitive adhesive, the installer can optionally activate one or more heating elements 404 on the low-profile antenna 110 to soften, or otherwise activate, the adhesive 402 for removal. In this configuration, the adhesive 402 can soften, for example, and enable the low-profile antenna 110 to be removed without damage to the building 106. In some examples, the adhesive 402 can be designed to come cleanly away from the building 106 with the low-profile antenna 110, for example, or to be removed with a solvent.

At 1406, the installer can remove the low-profile antenna 110 from the building 106. In the case of heat-sensitive adhesive 402, this may be as simple as pulling the low-profile antenna 110 of the building by hand, or prying the low-profile antenna 110 off the building with a screwdriver or pry bar. In the case of pressure sensitive adhesive, the installer may pull on a tab, or otherwise release the low-profile antenna 110 from the building. In the case of mechanical fasteners and brackets, the installer can disassemble/unfasten the brackets and/or fasteners, as applicable.

At 1408, the installer can disconnect the duplexer 204, any transceivers, and other equipment from the cellular backbone. Again, this may be as simply as unscrewing or unplugging a coaxial cable or an Ethernet cable, respectively. The installer may also disconnect any other electronics associated with the system 100 for installation in another location or simply for reclamation.

At 1410, the installer can remove the duplexer 204 and any other associated equipment from the building 106. This may include removing bracketry used to mount the equipment, equipment boxes or enclosures, and any other components of the system 100. As mentioned above, because little, to no, modifications were required to install the system 100, removal of the system 100 is simple and easy and also leaves almost no trace.

Figure 15:
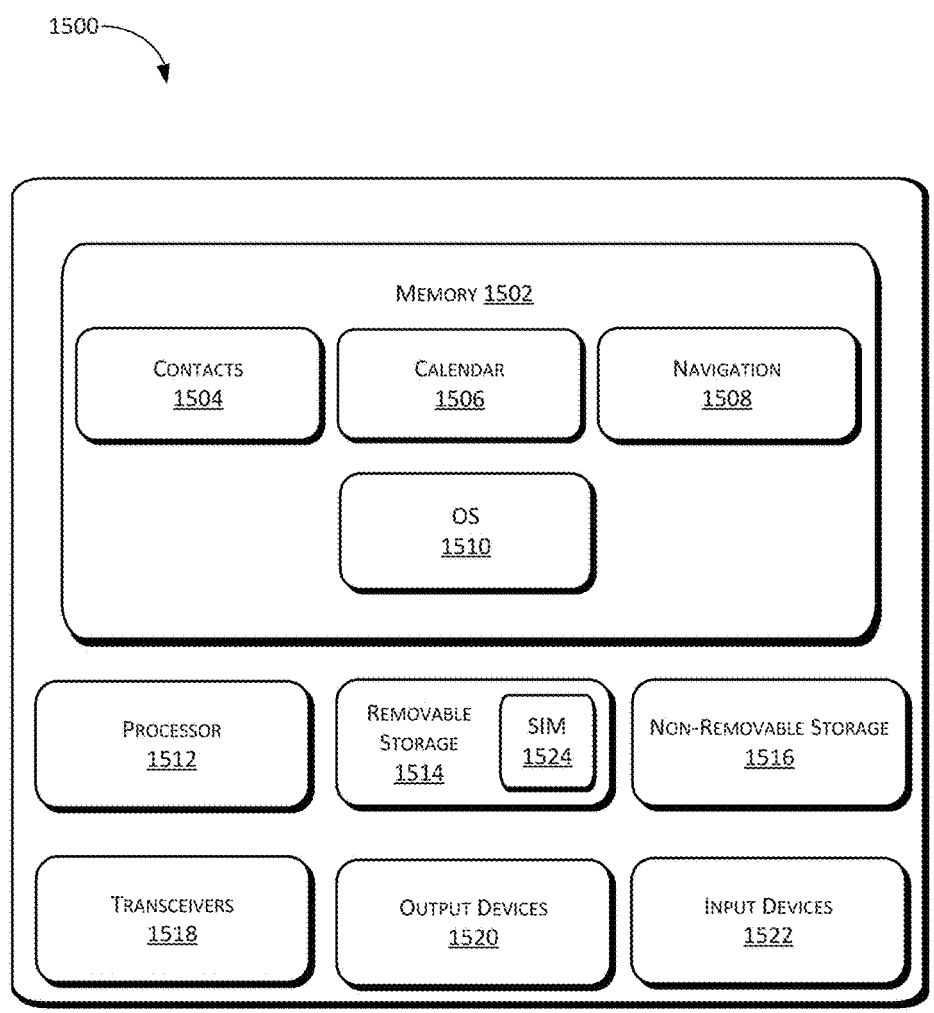
FIG. 15 is an example of a user equipment (UE) for use with the low-profile antenna system

As shown in FIG. 15, the systems 100, 1000 can be used in conjunction with a UE 1500 that can comprise a variety of electronic devices. For clarity, the UE 1500 is described herein generally as a cell phone or smart phone. One of skill in the art will recognize, however, that the system 100, 1000 can also be used with a variety of other electronic devices, such as, for example, tablet computers, laptops, desktops, and other network (e.g., cellular or IP network) connected devices from which a cellular voice and data can be accessed. Indeed, many devices capable of wireless and cellular communications (e.g., cellular, microwave, Wi-Fi, etc.) can be used with the systems 100, 1000 described herein including the so-called "Internet of Things," to include appliances, cars, smart meters, and so on. These devices are referred to collectively as UEs 1500.

The UEs 1500 can comprise a number of components to provide wireless communications, applications ("apps"), internet browsing, and other functions. As discussed below, the UEs 1500 can comprise memory 1502 including many common features such as, for example, the contacts 1504, calendar 1506, navigation software 1508, and the operating system (OS) 1510.

The UEs 1500 can also comprise one or more processors 1512. In some implementations, the processor(s) 1512 is a central processing unit (CPU), a graphics processing unit (GPU), or both CPU and GPU, or any other sort of processing unit. The UEs 1500 can also include one or more of removable storage 1514, non-removable storage 1516, transceiver(s) 1518, output device(s) 1520, and input device(s) 1522. In some examples, such as for cellular communication devices, the UEs 1500 can also include a subscriber identification module (SIM) 1524 including an International Mobile Subscriber Identity (IMSI), and other relevant information.

In various implementations, the memory 1502 can be volatile (such as random access memory (RAM)), non-volatile (such as read only memory (ROM), flash memory, etc.), or some combination of the two. The memory 1502 can include all, or part, of the functions 1504, 1506, 1508 and the OS 1510 for the UEs 1500, among other things.

The memory 1502 can comprise contacts 1504, which can include names, numbers, addresses, and other information about the user's business and personal acquaintances, among other things. In some examples, the memory 1502 can also include a calendar 1506, or other software, to enable the user to track appointments and calls, schedule meetings, and provide similar functions. In some examples, the memory 1502 can also comprise navigation software 1508 such as global positioning system (GPS) and/or cellular location based navigation systems. Of course, the memory 1502 can also include other software such as, for example, e-mail, text messaging, social media, and utilities (e.g., calculators, clocks, compasses, etc.).

The memory 1502 can also include the OS 1510. Of course, the OS 1510 varies depending on the manufacturer of the UE 1500 and currently comprises, for example, iOS 10.3.2 for Apple products and Nougat for Android products. The OS 1510 contains the modules and software that supports a computer's basic functions, such as scheduling tasks, executing applications, and controlling peripherals.

The UEs 1500 may also include additional data storage devices (removable and/or non-removable) such as, for example, magnetic disks, optical disks, or tape. Such additional storage is illustrated in FIG. 15 by removable storage 1514 and non-removable storage 1516. The removable storage 1514 and non-removable storage 1516 can store some, or all, of the functions 1504, 1506, 1508 and OS 1510.

Non-transitory computer-readable media may include volatile and nonvolatile, removable and non-removable tangible, physical media implemented in technology for storage of information, such as computer readable instructions, data structures, program modules, or other data. The memory 1502, removable storage 1514, and non-removable storage 1516 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UEs 1500. Any such non-transitory computer-readable media may be part of the UEs 1500 or may be a separate database, databank, remote server, or cloud-based server.

In some implementations, the transceiver(s) 1518 include any sort of transceivers known in the art. In some examples, the transceiver(s) 1518 can include wireless modem(s) to facilitate wireless connectivity with the other UEs, the Internet, and/or an intranet via a cellular connection. Further, the transceiver(s) 1518 may include a radio transceiver that performs the function of transmitting and receiving radio frequency communications via an antenna (e.g., Wi-Fi or Bluetooth®). In other examples, the transceiver(s) 1518 may include wired communication components, such as a wired modem or Ethernet port, for communicating with the other UEs or the provider's Internet-based network.

In some implementations, the output device(s) 1520 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UEs 1500 is connected to a network, the type of call being received (e.g., video calls vs. voice calls), the number of active calls, etc. Output device(s) 1520 also include ports for one or more peripheral devices, such as headphones, peripheral speakers, or a peripheral display.

In various implementations, input device(s) 1522 include any sort of input devices known in the art. For example, the input device(s) 1522 may include a camera, a microphone, a keyboard/keypad, or a touch-sensitive display. A keyboard/ keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 16:
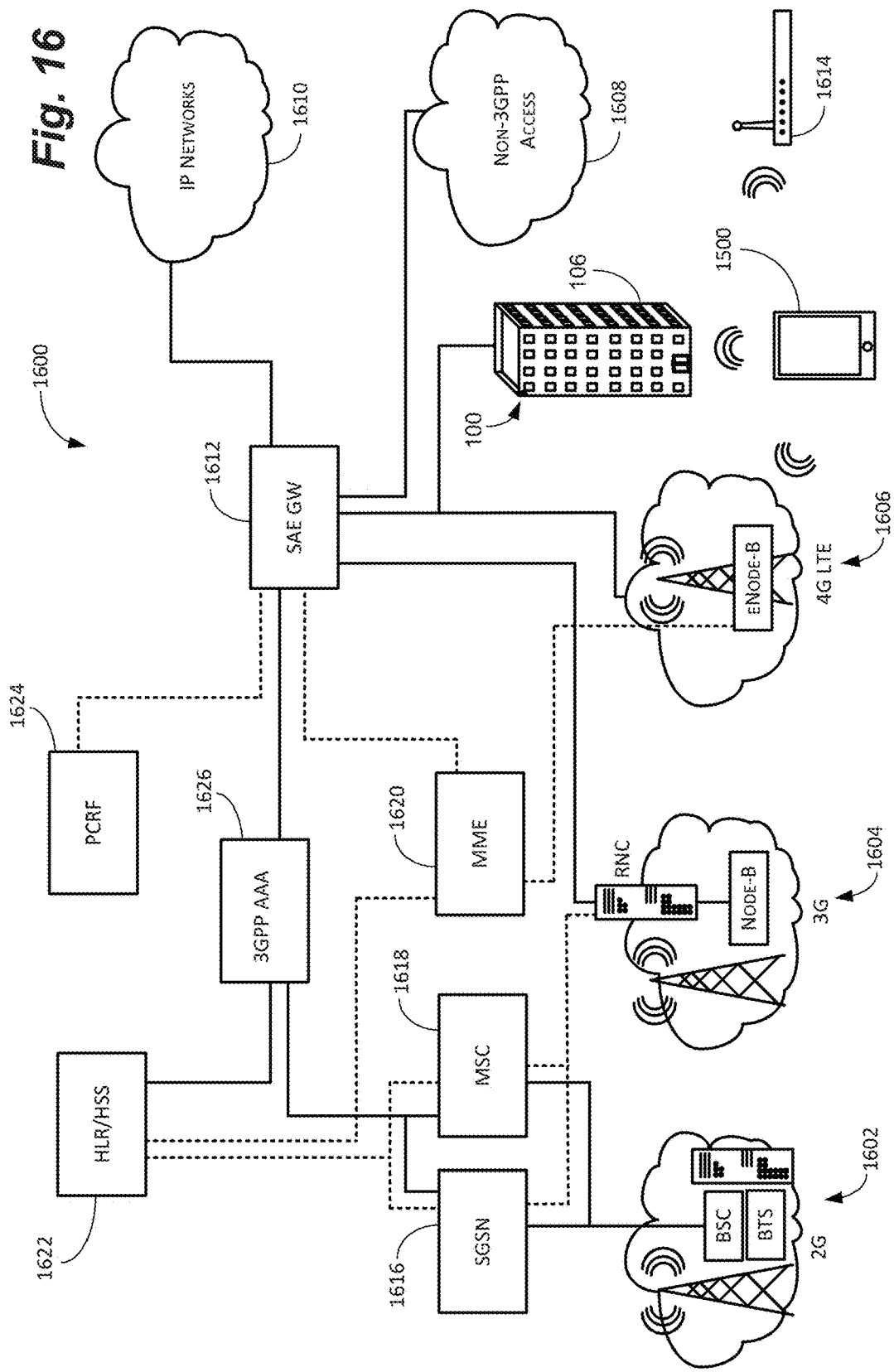
FIG. 16 is an example of a cellular network in communication with the system, in accordance with some examples of the present disclosure.

As shown in FIG. 16, the systems 100, 1000 can be used in conjunction with a number of wireless communications networks. As mentioned above, the 100, 1000 and methods 1300, 1400 described herein can be used to supplement throughput in areas of high demand where conventional cell towers, or "macro" cells, cannot practically be installed. As shown, the system 100 can be connected to the cellular backbone in a suitable manner to provide localized throughput to users in a compact, cost-effective, targeted manner. To this end, FIG. 16 depicts a conventional cellular network 1600 including 2G 1602, 3G 1604, and 4G long-term evolution (LTE) network 1606 components. Of course, future technologies, such as, for example, 6G and device-to-device (D2D) components could also be included and are contemplated herein.

As is known in the art, data can be routed from the Internet or other sources using a circuit switched modem connection (or non-3GPP connection) 1608, which provides relatively low data rates, or via IP network 1610 (packet switched) connections, which results in higher throughput. The LTE network 1606, which is purely IP based, essentially "flattens" the architecture, with data going straight from the internet to the service architecture evolution gateway (SAE GW) 1612 to evolved Node B (LTE system 1606) transceivers, enabling higher throughput. Many UEs 1500 also have wireless local area network (WLAN) 1614 capabilities, in some cases enabling even higher throughput. In some cases, cellular carriers may use WLAN communications in addition to, or instead of, cellular communications to supplement throughput.

The serving GPRS support node (SGSN) 1616 is a main component of the general packet radio service (GPRS) network, which handles all packet switched data within the network 1600—e.g. the mobility management and authentication of the users. The MSC 1618 essentially performs the same functions as the SGSN 1616 for voice traffic. The MSC 1618 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 1618 sets up and releases the end-to-end connection, handles mobility and hand-over requirements during the call, and takes care of charging and real time pre-paid account monitoring.

Similarly, the mobility management entity (MME) 1620 is the key control-node for the 4G LTE network 1606. It is responsible for idle mode UE 1500 paging and tagging procedures including retransmissions. The MME 1620 is involved in the bearer activation/deactivation process and is also responsible for choosing the SAE GW 1612 for the UE 1500 at the initial attach and at time of intra-LTE handover involving Core Network (CN) node relocation (i.e., switching from one cell tower to the next when traveling). The MME 1620 is responsible for authenticating the user (by interacting with the HSS 1622 discussed below). The Non-Access Stratum (NAS) signaling terminates at the MME 1620 and it is also responsible for generation and allocation of temporary identities to UE 1500. The MME 1620 also checks the authorization of the UE 1500 to camp on the service provider's HPLMN or VPLMN and enforces UE 1500 roaming restrictions on the VPLMN. The MME 1620 is the termination point in the network for ciphering/integrity protection for NAS signaling and handles the security key management. The MME 1620 also provides the control plane function for mobility between LTE network 1606 and 2G 1602/3G 1604 access networks with the S3 interface terminating at the MME 1620 from the SGSN 1616. The MME 1620 also terminates the S6a interface towards the home HSS 1622 for roaming UEs 1500.

The HSS/HLR 1622 is a central database that contains user-related and subscription-related information. The functions of the HSS/HLR 1622 include functionalities such as mobility management, call and session establishment support, user authentication and access authorization. The HSS, which is used for LTE connections, is based on the previous HLR and Authentication Center (AuC) from CGMA and GSM technologies, with each serving substantially the same functions for their respective networks.

The policy and charging rules unction (PCRF) 1624 is a software node that determines policy rules in the network 1600. The PCRF 1624 is generally operates at the network core and accesses subscriber databases (e.g., the HSS/HLR 1622) and other specialized functions in a centralized manner. The PCRF 1624 is the main part of the network 1600 that aggregates information to and from the network 1600 and other sources (e.g., IP networks 1610). The PCRF 1624 can support the creation of rules and then can automatically make policy decisions for each subscriber active on the network 1600. The PCRF 1624 can also be integrated with different platforms like billing, rating, charging, and subscriber database or can also be deployed as a standalone entity.

Finally, the 3GPP AAA server 1626 performs authentication, authorization, and accounting (AAA) functions and may also act as an AAA proxy server. For WLAN 1614 access to (3GPP) IP networks 1610 the 3GPP AAA Server 1626 provides authorization, policy enforcement, and routing information to various WLAN components. The 3GPP AAA Server 1626 can generate and report charging/accounting information, performs offline charging control for the WLAN 1614, and perform various protocol conversions when necessary.

While several possible examples are disclosed above, examples of the present disclosure are not so limited. For instance, while the systems and methods above are discussed with reference to use with cellular communications, the systems and methods can be used with other types of wired and wireless communications. In addition, while various adhesives and other installation methods and components of the system (e.g., the low-profile antenna 110 and duplexer 204), other installation methods and components could perform the same or similar functions without departing from the spirit of the invention.

The specific configurations, machines, and the size and shape of various elements can be varied according to particular design specifications or constraints requiring a low-profile antenna 110, mounting system, or other component constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
    a transparent low-profile antenna comprising:
        a transparent dielectric substrate with a first side, a second side opposite the first side, and a first edge surface;
        a plurality of metal ground traces disposed on the first side of the transparent dielectric substrate in a predetermined pattern to form a grid that acts as a ground plane;
        a plurality of radiating elements disposed on the second side of the transparent dielectric substrate, individual ones of the plurality of radiating elements including an first element and a second element, the second elements of the plurality of radiating elements sized and shaped to resonate at one or more frequencies;
        a plurality of radio frequency (RF) connectors positioned along the first edge surface of the transparent dielectric substrate to connect the system to an RF transceiver; and
        a plurality of feed traces to connect the plurality of radiating elements to the one or more RF connectors.

2. The system of claim 1, further comprising:
    one or more heating elements disposed on the first side of the transparent dielectric substrate in an overlying manner to the plurality of metal ground traces;
    a temperature sensitive adhesive disposed on the first side of the transparent dielectric substrate in an overlying manner to the one or more heating elements; and
    wherein activating the one or more heating elements decreases the adhesion between the temperature sensitive adhesive and a mounting surface for the system to enable the system to be removed from the mounting surface with no damage to the mounting surface.

3. The system of claim 2, wherein the temperature sensitive adhesive enables the system to be mounted to a surface without fasteners.

4. The system of claim 1, further comprising:
    a duplexer, in communication with the one or more RF connectors, and mounted remotely to the transparent low-profile antenna to reduce the profile of the transparent low-profile antenna when compared to an antenna with an integral duplexer.

5. The system of claim 1, further comprising:
    a plurality of decorative elements disposed in an overlying manner to the plurality of radiating elements at least partially covering individual ones of the plurality of radiating elements.

6. The system of claim 1, further comprising:
    a phase shifter, in communication with the first plurality of radiating elements, to enable a natural propagation pattern from the system to be altered to a steered propagation pattern; and
    wherein the phase shifter is mounted remotely to the transparent low-profile antenna to reduce the profile of the transparent low-profile antenna when compared to an antenna with an integral phase shifter.

7. The system of claim 1, wherein the transparent substrate, the radiating elements, the feed traces, and the metal ground traces enable at least a portion of light incident on the system to pass through the system.

8. A system comprising:
    a first low-profile antenna comprising:
        a first dielectric substrate with a first side and a second side;
        a first metal layer disposed on the first side of the first dielectric substrate to form a ground plane;
        a first plurality of printed circuit radiating elements disposed on the second side of the first dielectric substrate, the first plurality of printed circuit radiating elements sized and shaped to resonate at least a first frequency;
        a first group of radio frequency (RF) connectors to connect the first low-profile antenna to an RF transceiver position along one edge of the first dielectric substrate;
        a first plurality of feed traces to connect the first plurality of printed circuit elements to the first group of one or more RF connectors;
        a duplexer, mounted remotely from the first low-profile antenna to reduce the profile of the first low-profile antenna when compared to an antenna with an integral duplexer, to filter out at least one unwanted frequency; and
    wherein the at least one unwanted frequency is different from the first frequency.

9. The system of claim 8, further comprising:
    a second low-profile antenna comprising:
        a second dielectric substrate with a first side and a second side;
        a second metal layer disposed on the first side of the second dielectric substrate to form a ground plane;
        a second plurality of printed circuit radiating elements disposed on the second side of the second dielectric substrate, the second plurality of printed circuit radiating elements sized and shaped to resonate at least a second frequency;
        a second group of one or more radio frequency (RF) connectors to connect the second low-profile antenna to an RF transceiver; and
        a second plurality of feed traces to connect the plurality of printed circuit elements to the second group one or more RF connectors;
    wherein the duplexer is mounted remotely from the first low-profile antenna and the second low-profile antenna;
    wherein the duplexer filters out at least one unwanted frequency from at least one of the first low-profile antenna or the second low-profile antenna; and
    wherein one of the first frequency and the second frequency are associated with cellular communications upload frequencies; and
    wherein the other of the first frequency and the second frequency are associated with cellular communications download frequencies.

10. The system of claim 8, further comprising:
    a second plurality of printed circuit elements disposed on the second side of the first dielectric substrate, the second plurality of printed circuit elements sized and shaped to resonate at least a second frequency; and
    wherein the at least one unwanted frequency is different from the first frequency and the second frequency.

11. The system of claim 8, further comprising:
    a phase shifter in communication with the first plurality of printed circuit radiating elements to enable a natural propagation pattern from the system to be altered to a steered propagation pattern.

12. The system of claim 11, wherein the steered propagation pattern has a different azimuth, elevation, or both azimuth and elevation than the natural propagation pattern.

13. The system of claim 8, further comprising:
    one or more heating elements disposed on the first side of the first dielectric substrate in an overlying manner to the ground plane;

a heat-sensitive adhesive applied in an overlying manner to the one or more heating elements; and wherein the one or more heating elements heat the heat-sensitive adhesive to enable the first low-profile antenna to be installed, removed, or installed and removed from a structure without damaging the structure.

14. The system of claim 8, wherein a first dielectric substrate comprises a transparent or translucent substrate;

wherein the first metal layer comprises a pattern of metal ground traces; and wherein the transparent or translucent substrate, the radiating elements, the plurality of feed traces, and the first metal layer enable at least a portion of light incident on the system to pass through the system.

15. A method comprising:

mounting a first side of a low-profile antenna in a first location and facing a first direction on a transparent external surface on a structure using a heat sensitive transparent adhesive without additional fasteners;

mounting a duplexer in a second location on the structure that is different than the first location to reduce the profile of the low-profile antenna when compared to an antenna with an integral duplexer;

connecting the low-profile antenna to the duplexer with one or more radio frequency (RF) communications cables; and connecting the duplexer to a communications transceiver with one or more additional cables to connect the low-profile antenna to a communications network.

16. The method of claim 15, wherein the communications transceiver is in communication with a cellular backbone.

17. The method of claim 15, further comprising:

supplying a power source to one or more heating elements disposed between the first side of the low-profile antenna and the heat sensitive transparent adhesive to soften the heat sensitive adhesive prior to mounting the first side of the low-profile antenna in the first location.

18. The method of claim 15, further comprising:

supplying a power source to one or more heating elements disposed between the first side of the low-profile antenna and the heat sensitive transparent adhesive to soften the heat sensitive transparent adhesive; and removing the low-profile antenna from the external surface on the structure without damaging the structure.

19. The method of claim 15, wherein the low-profile antenna comprises a transparent or translucent dielectric substrate;

wherein the external surface comprises a window; and wherein the structure comprises a building.

20. The method of claim 15, further comprising:

mounting a phase shifter in the second location; and connecting the duplexer to the phase shifter with one or more radio frequency (RF) communications cables.

* * * * *